US010625586B2

(12) United States Patent
Møller

(10) Patent No.: US 10,625,586 B2
(45) Date of Patent: Apr. 21, 2020

(54) LID ASSEMBLY FOR A TRUCK BED

(71) Applicant: PENDELMATIC INTERNATIONAL V/JAN MØLLER, Greve (DK)

(72) Inventor: Jan Max Clausen Møller, Greve (DK)

(73) Assignee: PENDELMATIC INTERNATIONAL V/JAN MØLLER, Greve (DK)

( * ) Notice: Subject to any disclaimer, the term of this patent is extended or adjusted under 35 U.S.C. 154(b) by 0 days.

(21) Appl. No.: 15/776,304

(22) PCT Filed: Jan. 20, 2017

(86) PCT No.: PCT/DK2017/050012
§ 371 (c)(1),
(2) Date: May 15, 2018

(87) PCT Pub. No.: WO2017/125113
PCT Pub. Date: Jul. 27, 2017

(65) Prior Publication Data
US 2018/0326826 A1    Nov. 15, 2018

(30) Foreign Application Priority Data

Jan. 20, 2016 (DK) ................................ 2016 70029

(51) Int. Cl.
*B60J 7/16* (2006.01)
(52) U.S. Cl.
CPC .................................. *B60J 7/1614* (2013.01)
(58) Field of Classification Search
CPC ..................................................... B60J 7/1614
See application file for complete search history.

(56) References Cited

U.S. PATENT DOCUMENTS 2,899,172 A * 8/1959 Cresci ...................... B60P 1/02
254/122
4,848,830 A   7/1989 Parson
(Continued)

FOREIGN PATENT DOCUMENTS

DK         200800093 U3    8/2009

OTHER PUBLICATIONS

International Search Report dated Mar. 31, 2017 for PCT Application No. PCT/DK2017/050012.
(Continued)

*Primary Examiner* — Lori L Lyjak
(74) *Attorney, Agent, or Firm* — Moser Taboada

(57) ABSTRACT

A lid assembly for a truck bed with two opposite vertical side walls includes a lid adapted for covering the truck bed, the lid being movable in a first direction between an open and closed position, two scissor hinges adapted for mounting the lid to the truck bed, each of the two scissor hinges having a first hinge member adapted for being slidably and pivotably connected to a respective side wall of the truck bed at a first end and being pivotably connected to the lid at a second end, and a second hinge member which is slidably and pivotably connected to the lid at a first end and adapted for being pivotably connected to the respective side wall at a second end. The assembly further includes an opening element adapted for, upon actuation, applying a force to at least one of the first ends of the hinge members in a second direction, which extends in an angle of between 85 and 90 degrees with respect to the first direction, to move the lid in the first direction.

13 Claims, 7 Drawing Sheets

(56) References Cited

U.S. PATENT DOCUMENTS

Figure 1:
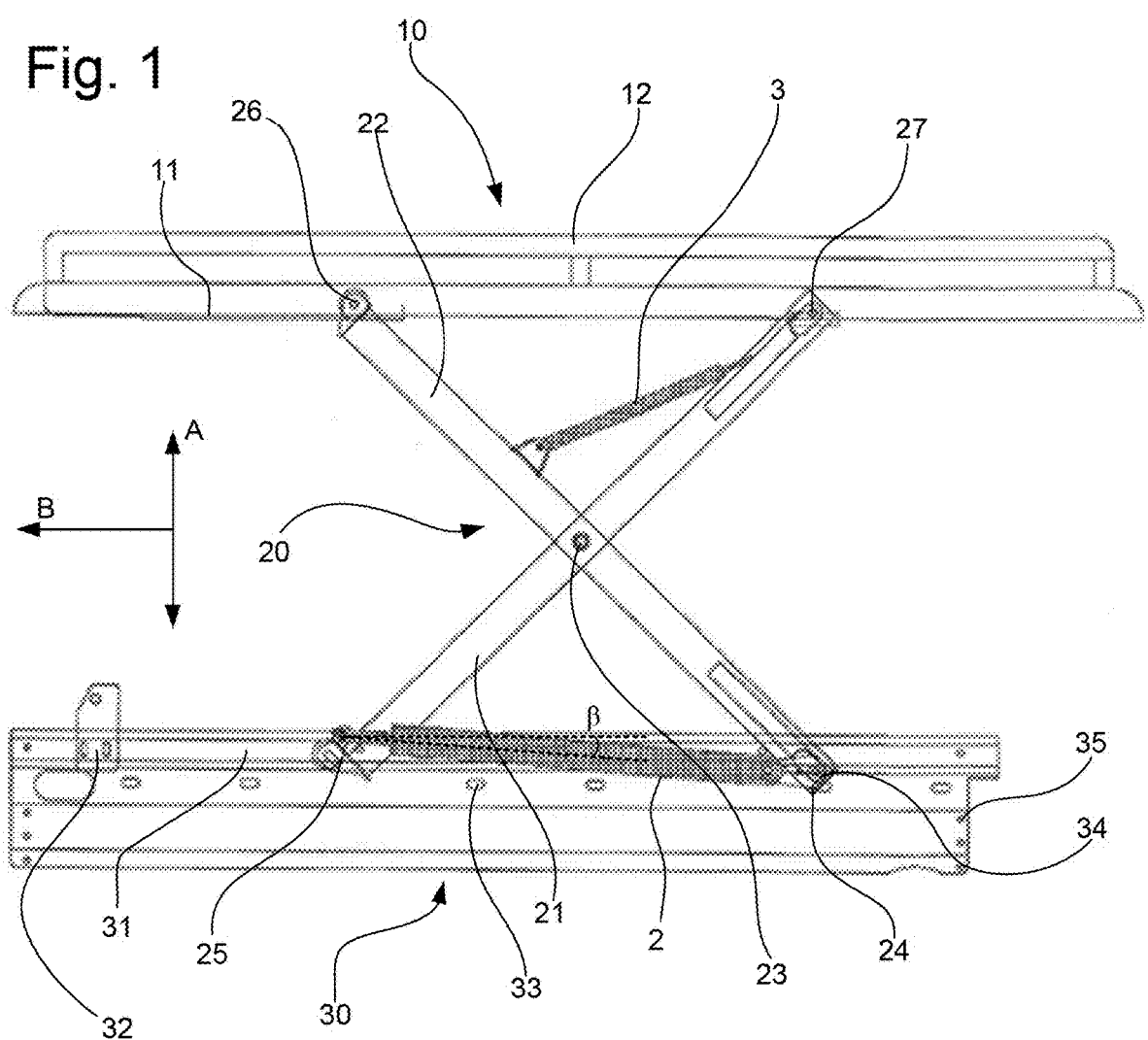

| | | | |
|---|---|---|---|
| 5,016,858 A | | 5/1991 | Mitchell |
| 5,366,266 A | | 11/1994 | Harbison |
| 5,503,450 A | | 4/1996 | Miller |
| D375,602 S | * | 11/1996 | Henthorn .................. D34/28 |
| 6,150,781 A | | 11/2000 | Hollerbach |
| 6,209,944 B1 | | 4/2001 | Billiu et al. |
| 6,402,224 B1 | | 6/2002 | Monaco et al. |
| 6,749,249 B1 | | 6/2004 | Lang |
| 7,055,802 B1 | * | 6/2006 | Jones .................. B62B 1/002 |
| | | | 254/122 |
| 2004/0256873 A1 | | 12/2004 | McManus et al. |
| 2006/0033355 A1 | | 2/2006 | Boulard et al. |
| 2011/0095559 A1 | | 4/2011 | Edens |
| 2011/0309651 A1 | | 12/2011 | Hernandez et al. |

OTHER PUBLICATIONS

"XTop with X-Factor for X-Class." an online article published on the website URL https://altomvarebiler.dk/xtop-med-x-faktor-til-x-klasse/. downloaded on Aug. 13, 2018.

\* cited by examiner

LID ASSEMBLY FOR A TRUCK BED

The present invention relates to lids and lid assemblies for covering a truck bed, such as a truck bed of a pick-up truck.

Hard cover lids are commonly used to cover truck beds in order to protect carried cargo from the elements and to keep loose objects from falling off during transport. With conventional truck lids the lid is mounted on the truck by pivot hinges at the back of the truck bed and supported by gas springs at the opening end to aid opening of the lid. These lids however, suffer from the drawback of limited load volume as the distance between the lid and the truck bed near the pivot hinges put a limit on the height of the cargo.

Lids such as the one described in the applicants own DK 200800093 U3 overcome this by using a scissor hinge to mount the lid to the vertical side walls of the truck bed, such that the entire lid can be lifted and kept parallel with the truck bed during opening and in the opened position, so that the entire loading area of the truck bed may be utilized. Additionally, the lid may be used to support long cargo objects by locking the lid in a position where it is aligned with the roof of the truck, whereby the lid and roof become a secondary truck bed. By locking the lid at a certain height, the lid may also be used as a working platform such that ladders or scaffolding may be saved for smaller building projects.

A drawback of this type of lid is that when a load is put on top of the lid, e.g. when it is used as a work platform or when snow has settled on the lid, it may become too heavy to open or move it between locked positions. These lids also rely on a separate locking element to lock the lid in place, which limits the number of intermediate positions between fully opened and closed to a few predetermined positions.

A further drawback, which arises from fact that some truck models are manufactured with non-parallel side walls of the truck bed, is that the scissor hinges which extend vertically from the side walls will also be non-parallel as they are mounted on the side walls. This in turn require a customized lid in order to connect the lid to the scissor hinges, making it impossible to manufacture a lid assembly that can fit most trucks.

Based on this prior art it is the object of the invention to provide a lid assembly which overcomes the above drawbacks, while still allowing the entire loading area of the truck bed to be utilized.

According to the present invention this is accomplished by a lid assembly for a truck bed with two opposite vertical side walls, comprising a lid adapted for covering the truck bed, said lid being movable in a first direction between an open and closed position, two scissor hinges adapted for mounting the lid to the truck bed, each of said scissor hinges having a first hinge member adapted for being slidably and pivotably connected to a respective side wall of the truck bed at a first end and being pivotably connected to the lid at a second end, and a second hinge member which is slidably and pivotably connected to the lid at a first end and adapted for being pivotably connected to the respective side wall at a second end, and an opening element adapted for, upon actuation, applying a force to at least one of the first ends of the hinge members such as to move the lid in the first direction, said force being directed in a second direction, which extends in an angle of between 85 and 95 degrees with respect to the first direction.

By providing the lid assembly with an opening element adapted for, upon actuation, applying a force to at least one of the first ends of the hinge members such as to move the lid in the first direction the lid may be opened, even when heavy loads are put on top of the lid. Such an opening element may also be stopped in a given position while remaining engaged such as to keep the lid in a certain position, thereby replacing the need for a separate locking element.

Additionally, by arranging the opening element such that it applies a force to at least one of the first ends of the hinge members in a second direction, which extends in an angle of between 85 and 95 degrees with respect to the first direction, the opening means may be arranged such that it in the mounted position of the lid assembly is hidden either below the upper edge of the side walls or in the lid. This not only makes the lid assembly more aesthetically appealing, but also increases the safety during operation by minimizing the risk of objects or a part, such as a hand, of the user inadvertently becoming caught in the scissor hinge.

According to an embodiment of the invention the second direction is substantially perpendicular to the first direction. Thereby it is ensured that the opening element remains hidden irrespective of its position during use, thus further increasing the safety during operation.

According to an embodiment of the invention the lid, during movement in the first direction, remains parallel with the second direction. This allows the lid to be used as a work platform or a scissor lift, as items or people can remain on the lid, while the lid is moved.

In an embodiment of the invention the opening element is arranged extending between the first hinge member and the second hinge member of one of the scissor hinges and being attached to the first hinge member at the first end of the first hinge member and to the second hinge member at the second end of the second hinge member, respectively. This allows the opening element to pull the first end of a hinge member towards the second end of the opposite hinge member, thereby opening the scissor hinge. Furthermore, it is ensured that the opening element beyond any doubt remains hidden irrespective of its position during use, thus further increasing the safety during operation.

In an embodiment of the invention, the opening element is either a pneumatic cylinder or a hydraulic cylinder. Such opening elements can easily be integrated with the truck, and the power required to run the pump for the cylinder can be supplied from either the truck's own battery or a small auxiliary system. Alternatively, the opening element may be an electrical actuator, or other types of linear actuators. The advantage of electrical actuators is that they are fast reacting upon actuation.

In embodiments wherein the opening element only are capable of providing an opening force, e.g. single-acting cylinders, the lid assembly may further comprise a closing element adapted to bias said lid towards the closed position. Although the weight of the lid itself will in most cases be sufficient for the lid to close, such a closing element ensures the closing force is sufficient to overcome the friction of the lid assembly and the opening element.

According to an embodiment of the invention the closing element is a gas spring arranged such that it is compressed upon opening of the lid. A gas spring is a cheap and simple way of providing the closing element as it uses the force of the opening element to load. The energy stored in the gas spring will then aid closing of the lid when the opening element is disabled.

In some embodiments the lid assembly further comprises two mounting profiles adapted for being installed adjacent to respective side walls of the truck bed and parallel to each other and comprises connection elements for connection with the first ends of the first hinge members and the second ends of the second hinge members. Thereby allowing the first end of the first hinge member and the second end of the second hinge member may be mounted on the side wall of the truck via the mounting profiles instead of directly onto the side wall of the truck.

The advantage of using mounting profiles instead of mounting the scissor hinges directly onto the side walls of the truck bed is that the mounting profiles can be installed such that they are parallel with each other, even if the side walls of the truck bed are not. This allows a standard lid assembly to be mass produced for trucks of a standard size, e.g. pickup trucks, as the lid assembly is independent of the angle of the side walls of the truck bed. This in turn provides for a lid assembly being more cost-efficient to produce.

According to an embodiment of the invention the lid assembly further comprises two cover profiles adapted for being arranged such that each of the two cover profiles overlaps a respective mounting profile and the adjacent vertical side wall of the truck bed.

When installing the mounting profiles at non-parallel side walls, there will be a gap between the side wall and the mounting profile. Providing cover profiles enables covering such a gap to obtain not only a more aesthetically appealing finish, but also to avoid sharp edges of the mounting profiles being exposed.

According to an embodiment of the invention the lid assembly further comprises a mounting element adapted for being installed at an end wall of the truck bed and/or comprising elements for installing the mounting profiles to the truck bed.

By using a mounting element on the end wall of the truck bed an orthogonal surface which the mounting profiles can be installed on by angled brackets is provided. This allows for the mounting profiles to be installed without drilling permanent mounting holes in the truck, which many truck owners are reluctant to do. The mounting holes may be put in the mounting element instead. The mounting element itself should preferably be adapted for being installed by means of a snap-on lock to completely avoid permanent mounting solutions.

In an embodiment of the invention at least one of the mounting profiles are adapted for extending along the whole length of the side wall of the truck bed. This allows the mounting elements to be installed orthogonally on the end wall or drivers cabin and at the tail gate, so that the mounting profiles are parallel to each other, even when the side walls are not.

In an embodiment of the invention at least one of the cover profiles are adapted for extending along the whole length of the side wall of the truck bed. This allows the cover elements to be installed in such a way that any gap between the mounting profiles and the side wall of the truck bed are completely covered as well as that any sharp edges of the mounting profiles are completely covered.

According to an embodiment of the invention the mounting elements are adapted for extending along the whole length of the end wall of the truck bed. This allows the mounting elements to span the entire width of the truck bed between the side walls, so that both of the mounting profiles can be attached to the mounting element at the respective side wall.

According to an embodiment of the invention the mounting profiles comprise a groove extending along the length of the mounting profiles. The groove is preferably c-shaped, so that the groove may retain various elements.

The groove may provide the slidable connection between the first end of the first hinge and the mounting profile by retaining a wheel or a slide shoe pivotably connected to the first end of the first hinge member, so that the wheel or the slide shoe is slidable within the groove while the first hinge member is pivotable around the wheel or the slide shoe.

The groove may further be used for the connection component, which provide the pivotable connection between the second end of the second hinge member and the mounting profile.

By allowing the connection between at least one of the first end of the first hinge member and the second end of the second hinge member the mounting profile to be slidable during mounting of the lid and fixed in a certain position within the groove after mounting, the position of the lid in relation to the mounting profiles may be customized according to the truck bed on which the lid assembly is to be mounted. Thereby, the same lid assembly may be used for even more different types of truck beds.

According to an embodiment of the invention the lid assembly further comprises one or more installation brackets adapted for installing the mounting profiles on the truck bed, wherein the one or more installation brackets are slidable within the groove of the mounting profile during installation and fixed after installation.

This allows the position of the mounting profile relative to the truck bed to be customized according to the truck bed on which the lid assembly is to be mounted, thereby ensuring that the mounting profile will fit any truck bed.

In an embodiment of the invention, the lid assembly further comprises a safety mechanism adapted to, upon actuation, activate the opening element during closing of the lid assembly, such that the closing of the lid is interrupted and the opening element opens the lid assembly.

By providing the lid assembly with a safety mechanism, it is ensured that closing of the lid assembly is stopped and reversed in the event that a limb of a user or similar is caught in the lid assembly during closing of the lid assembly.

In embodiments comprising the safety mechanism and the mounting profiles, the groove of each respective mounting profile provide the slidable connection between the first end of the respective first hinge member and the mounting profile by retaining a wheel or a slide shoe pivotably connected to the first end of the first hinge member, and the safety mechanism comprise a pressure switch arranged on an upper wall of at least one of the grooves.

In one such embodiment, this is achieved by the groove having a width, i.e. the distance between the lower and upper wall, which is greater than the dimension of the wheel or slide shoe providing the slidable connection of the first hinge member and the mounting profile, such that a spacing is provided between the upper wall and the wheel or slide shoe. In the event that something is caught in the lid assembly, e.g. between a side wall and a hinge member, during closing, the wheel or slide shoe will be pushed upwards, whereby the wheel or slide shoe will engage the pressure switch and actuate the safety mechanism.

Although the closing force is in most embodiments provided by passively allowing the lid to close by its own weight against the force required to reset the opening element or by the bias of the closing element, neither of which are sufficient to cause severe harm to a user in case a limp is stuck in the lid assembly, it is desirable to provide a safety mechanism such that the opening element will automatically open the lid in the event that a body part was to get stuck in the lid assembly.

Figure 2:
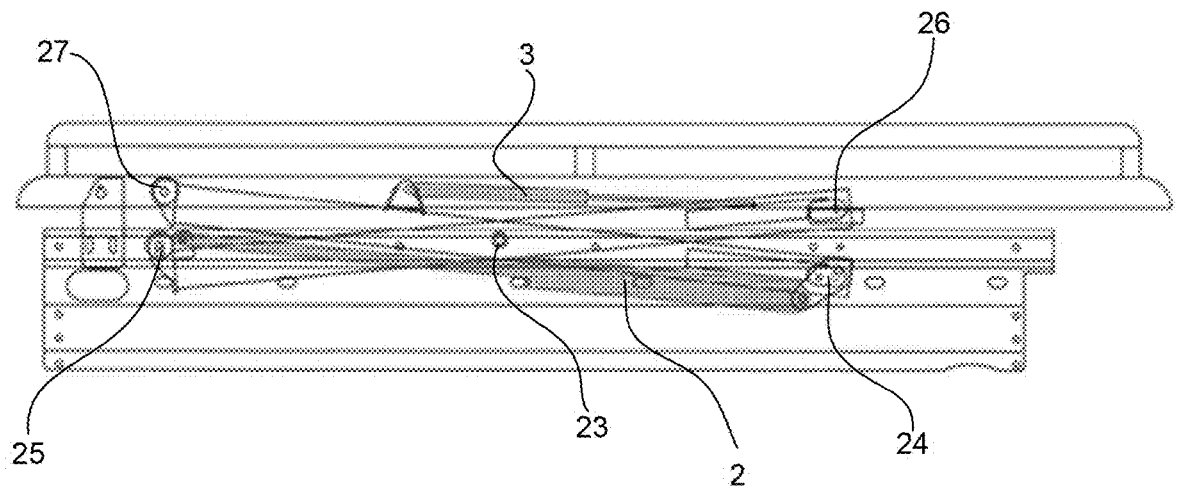
Figure 3:
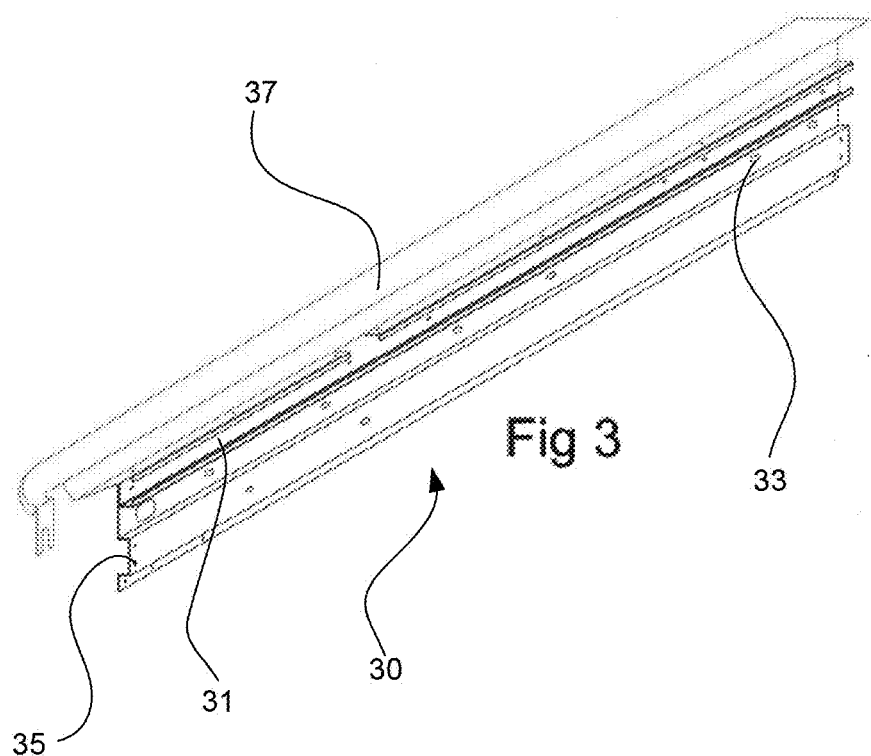
Figure 4:
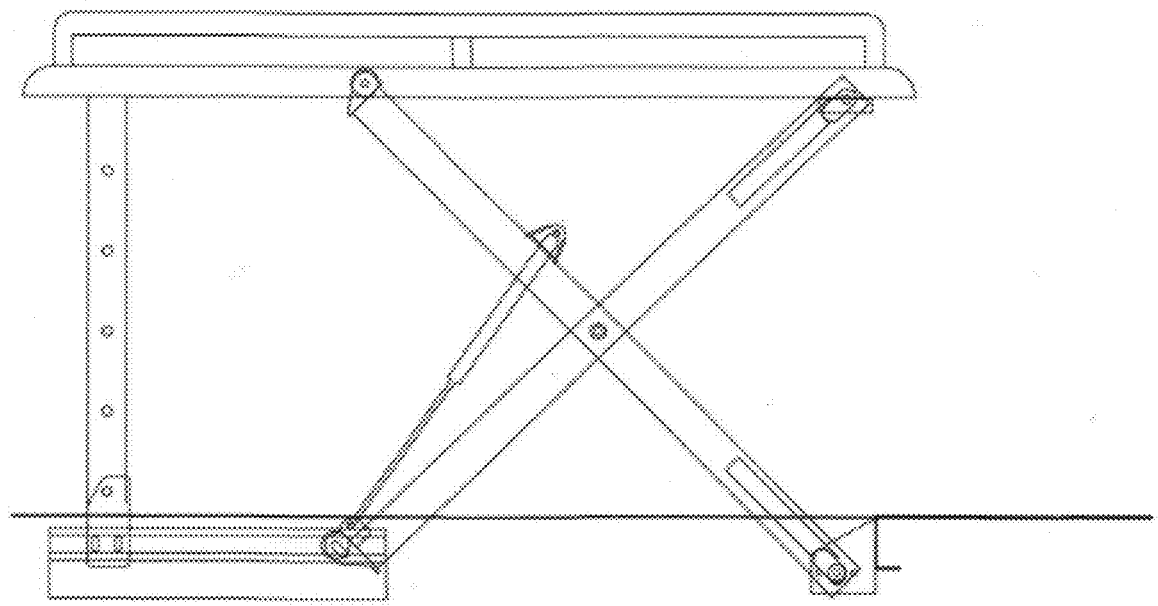
Figure 5:
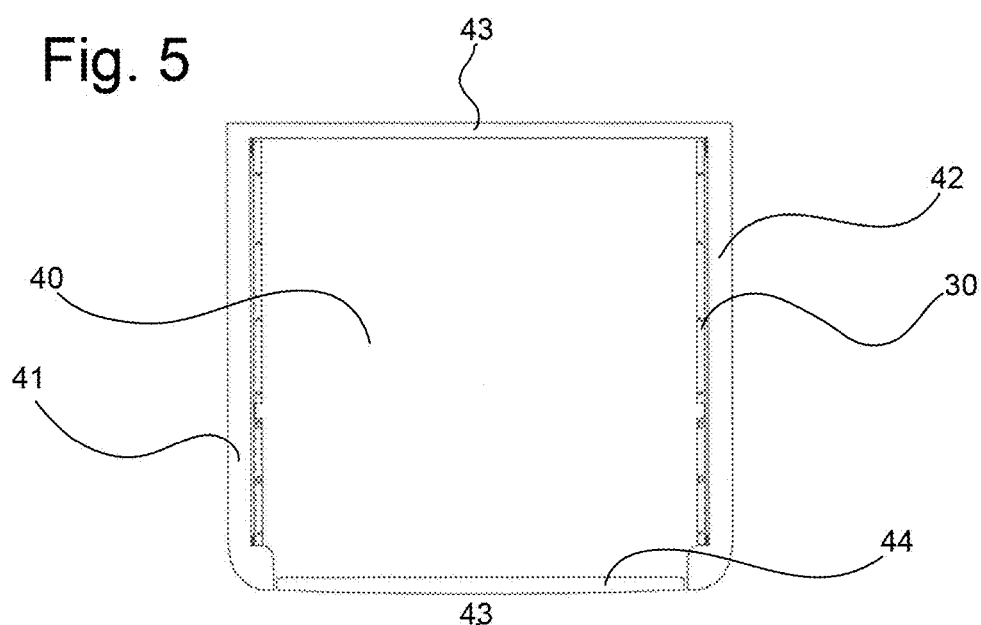
Figure 6:
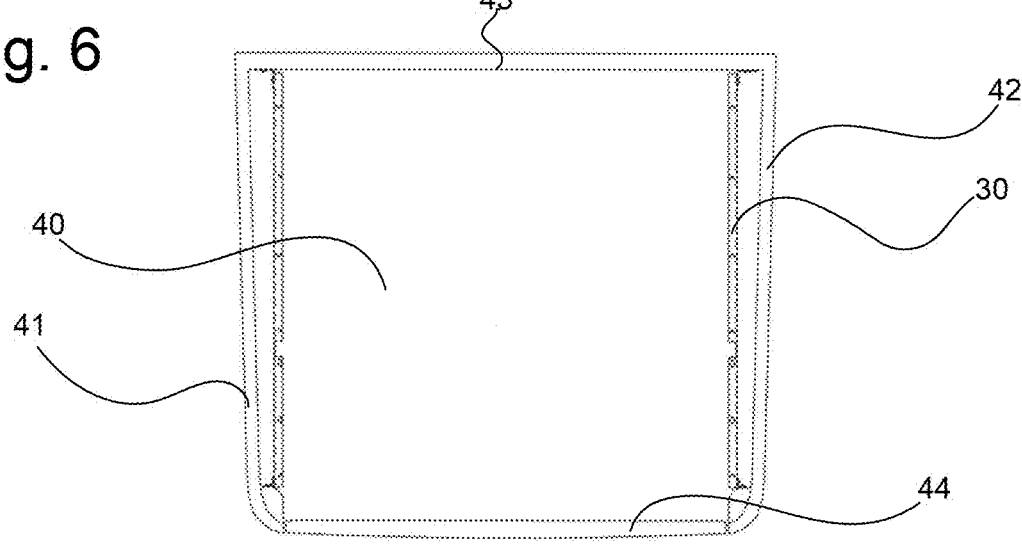
Figure 7:
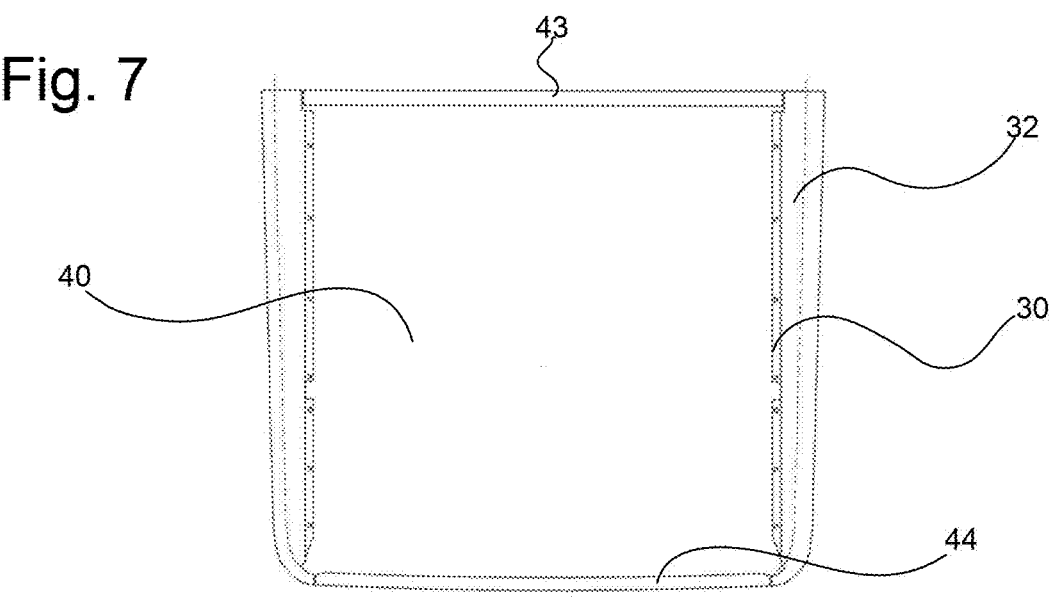
Figure 8:
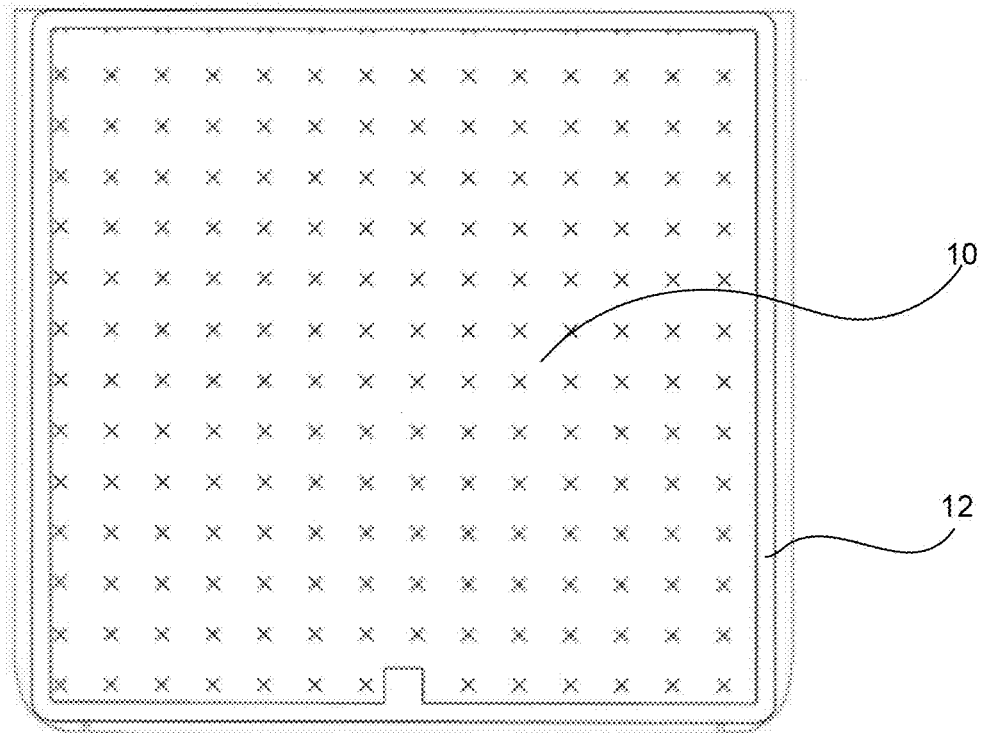
Figure 9:
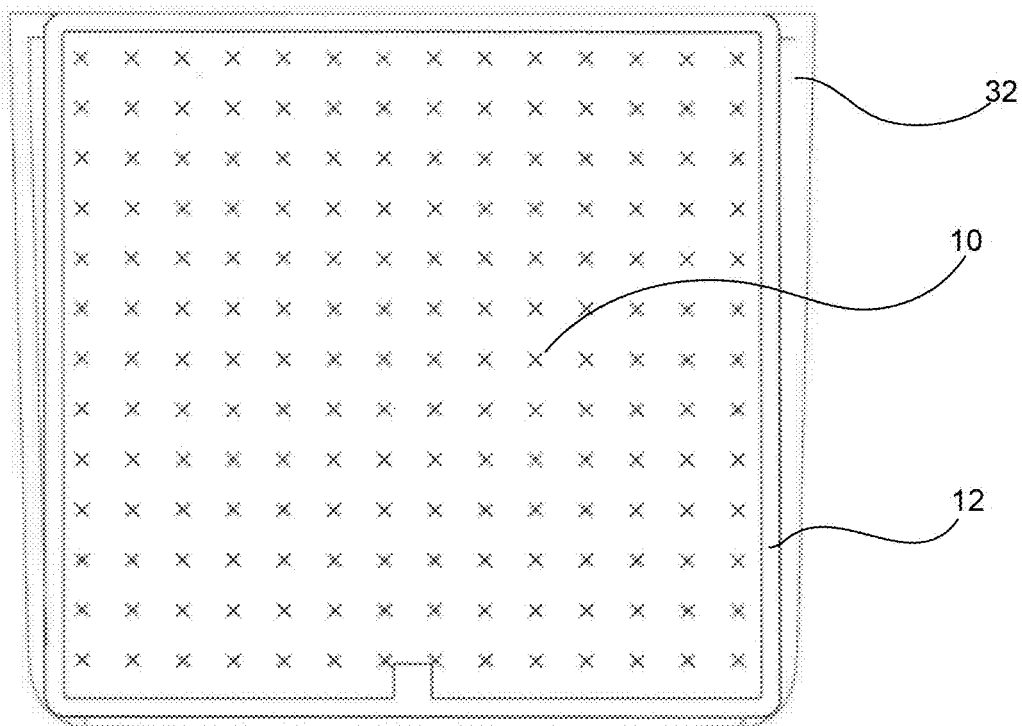
Figure 10:
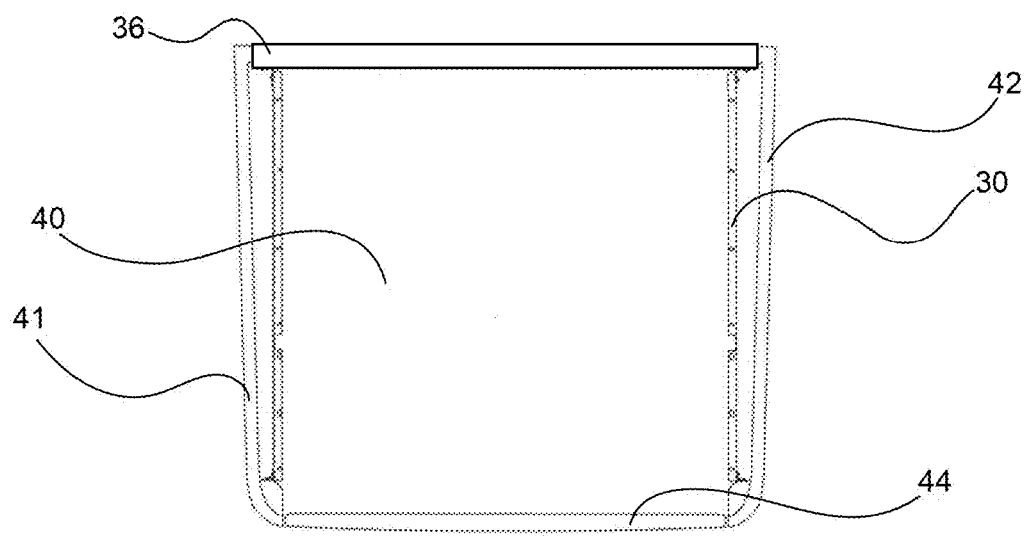
Figure 11:
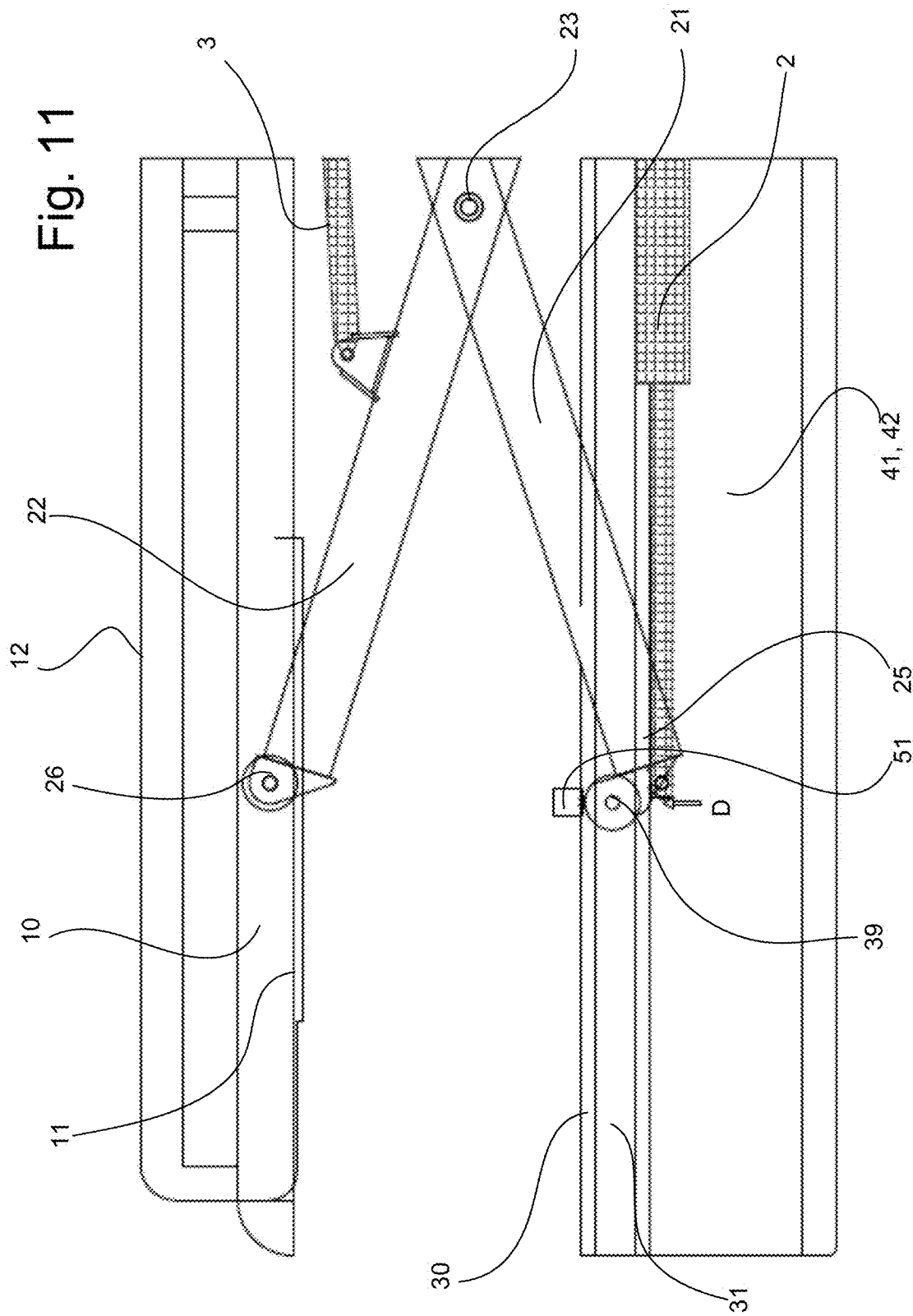
Figure 12:
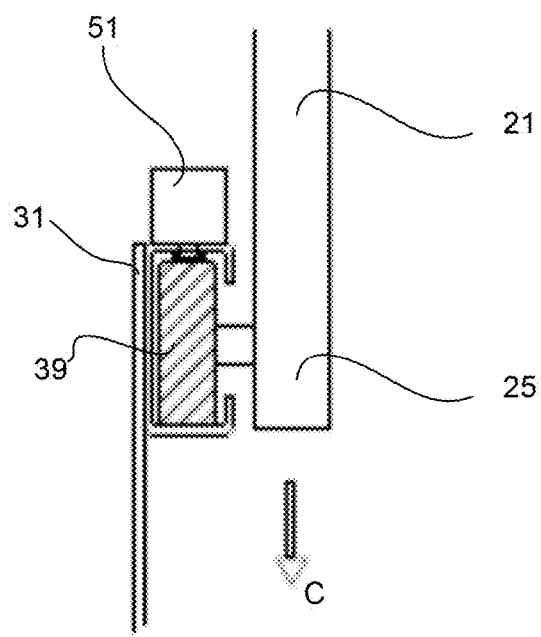
Figure 13:
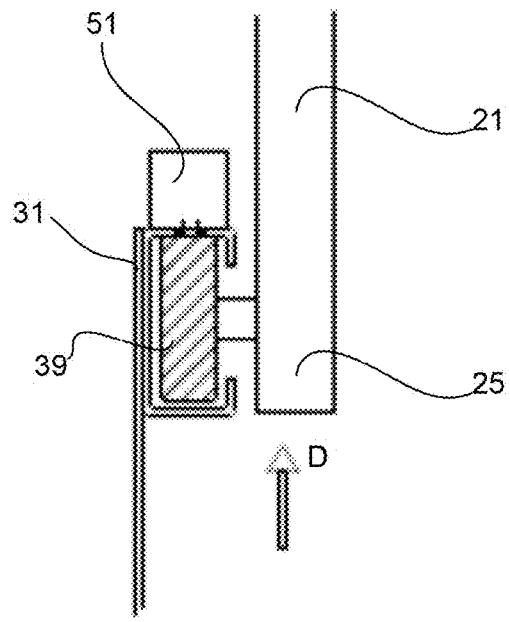
Figure 14:
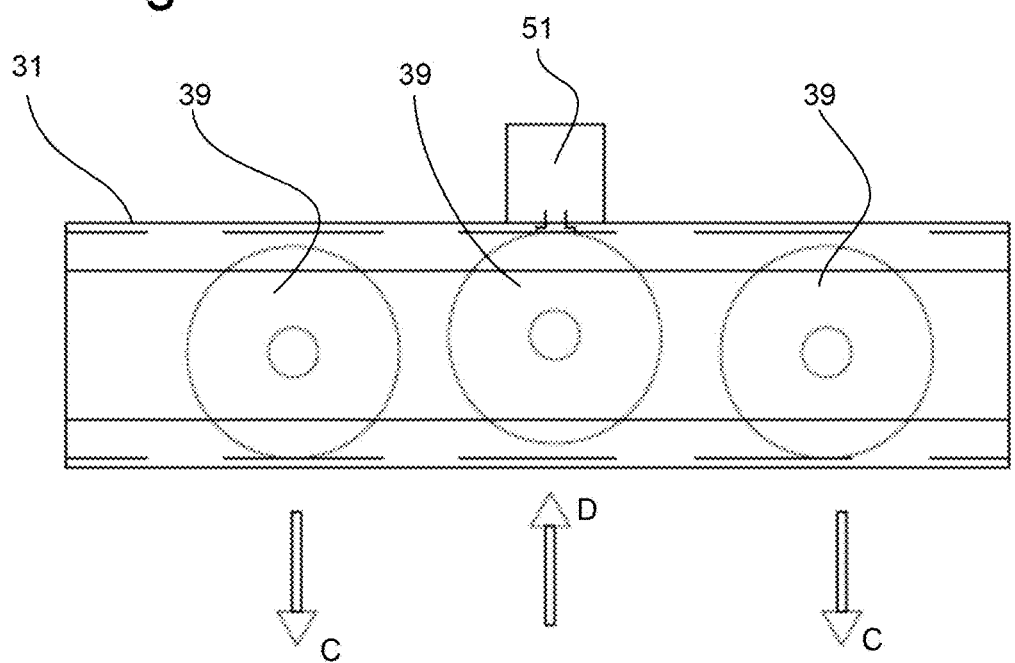

The present invention will now be described in greater detail based on preferred embodiments with reference to the drawings on which:

FIG. 1 shows a schematic side view of a lid assembly according to the invention in the open position, FIG. 2 shows a schematic side view of a lid assembly according to the invention in the closed position, FIG. 3 shows a perspective view of a single mounting profile of the lid assembly, FIG. 4 shows a schematic side view of a lid assembly according to the prior art in the open position, FIG. 5 shows a top view of the mounting profiles installed on a truck bed with parallel side walls, FIG. 6 shows a top view of the mounting profiles installed on a truck bed with non-parallel side walls, FIG. 7 shows the truck bed of FIG. 6, wherein the gaps between the mounting profiles and the side walls have been covered by cover profiles, FIG. 8 shows a top view of the lid assembly according to the invention mounted on a truck bed with parallel side walls, FIG. 9 shows a top view of the lid assembly according to the invention mounted on a truck bed with non-parallel side walls, FIG. 10 shows a top view of the mounting profiles installed on a truck bed with non-parallel side walls, wherein the mounting profiles have been installed on a mounting element, FIG. 11 shows a side view of the lid assembly according to the invention comprising a safety mechanism, FIG. 12 shows an end view of the groove of a mounting profile providing the slidable connection of the first hinge member during normal operation, FIG. 13 shows an end view of the groove of the mounting profile when something is caught in the lid assembly, and FIG. 14 shows a side view of the groove of a mounting profile.

Turning first to FIGS. 1 and 2 an embodiment of a lid assembly according to the invention seen from the side in the fully open and closed position, respectively, is shown. The lid assembly generally comprises a lid 10, two scissor hinges 20, an opening element 2, and optionally two mounting profiles 30.

The lid 10 is movable in a first direction A between the closed position and the fully open position and be locked in any intermediate position. The lid 10 has a lower surface adapted for facing the truck bed 40 (cf. e.g. FIG. 5) in a mounted condition of the lid 10 and furthermore has an opposite upper surface. The lid 10 can be manufactured according to standard sizes of truck beds of various truck types, e.g. pickup trucks, in order to allow mass production. The lid 10 includes a rail 12 which extends around the periphery of the upper surface of the lid 10 to allow items carried on the upper surface of the lid 10 to be secured using straps.

In the embodiment shown in FIGS. 1 and 2, the lid assembly comprises two mounting profiles 30 which are adapted for being installed at respective opposite side walls 41, 42 (cf. e.g. FIG. 5) of the truck bed 40 to mount the lid 10 to the truck bed 40. The two mounting profiles 30 are adapted for being installed such that they are parallel to each other even if the side walls 41, 42 of the truck bed 40 are not.

This may be accomplished either by attaching the mounting profiles directly on the side walls, using spacers if the side walls are non-parallel, on the truck bed using angled brackets, or to either an end wall of the truck bed 40 or to the driver's cabin using angled brackets. This arrangement allows a standardized lid assembly to be wheel 39 manufactured for various truck types, as the mounting profiles 30 can be installed on all of the standard models regardless of the angle of the side walls of the truck bed 40.

As shown in FIG. 10 the lid assembly may in some embodiments, if the truck bed has an end wall 43, further comprise a mounting element 36 adapted for being installed on the end wall 43 to provide a surface orthogonally to which the mounting profiles 30 can be attached. In these embodiments the mounting element 36 is preferably adapted for being installed to the end wall 43 by means of a non-permanent snap-on lock, such that permanent mounting solutions, e.g. drilling mounting holes, can be avoided.

The lid 10 is connected to the mounting profiles 30 by two scissor hinges 20 arranged at respective opposite sides of the lid 10. The scissor hinges 20 ensure that the lid 10 remain parallel with the truck bed 40 in all positions of the lid 10. Each scissor hinge 20 comprises a first hinge member 21 and a second hinge member 22 which are connected to each other at a central pivoting point 23.

Each of the first hinge members 21 are pivotably and slidably connected to the respective mounting profiles 30 at a first end 25 and pivotably connected to the lid 10 at a second end 27, while each the second hinge members 22 are pivotably and slidably connected to the lid 10 at a first end 26 and pivotably connected to the respective mounting profiles 30 at a second end 24.

The slidable and pivotable connection of the first ends 25, 26 of the hinge members 21, 22 are provided by each of the first ends 25, 26 of the hinge members 21, 22 being connected to a wheel 39 retained in a groove 31, 11 in the mounting profile 30 and the lid 10 respectively, whereby the wheel 39 is able to slide within the groove 31, 11 and the hinge member 21, 22 is able to pivot around the wheel 39. The groove 31, 11 may be e.g. a C-shaped or a U-shaped groove.

The opening element 2 is arranged extending below an upper edge of the mounting profile 30 and thus, in the mounted condition of the lid assembly, below an upper edge of the side wall 41 or 42 of the truck bed 40. The opening element 2 is adapted for, upon actuation, applying a force to at least one of the first ends 25, 26 of the hinge members 21, 22 such as to move the lid 10 in the first direction A. The said force is directed in a second direction B, which extends in an angle β of between 85 and 95 degrees with respect to the first direction A.

The opening element 2 is arranged between the first hinge member 21 and the second hinge member 22 of one of the scissor hinges 20 and is attached to the first hinge member 21 at the first end 25 and to the second hinge member 22 at the second end 24.

In the shown embodiment, the opening element 2 is provided as a single-acting hydraulic cylinder connected at or to a first end 25 of one of the first hinge members 21 and fixed to the mounting profile 30, such that the hydraulic cylinder 2 will pull open the scissor hinge when the piston of the hydraulic cylinder 2 is retracted into the barrel of the hydraulic cylinder 2.

Because the hydraulic cylinder 2 is single-acting it is only able to provide an opening force and not a closing force. The hydraulic cylinder 2 could alternatively be a double-acting cylinder. This however, is an optional feature as the lid 10 can be closed by depressurizing the hydraulic cylinder 2, whereby the lid 10 closes by its own weight. Depressurization of the hydraulic cylinder 2 can be done by controlled opening of a valve in the hydraulic cylinder 2, whereby the hydraulic cylinder 2 is reset by the weight of the lid 10. Pressurization of the hydraulic cylinder 2 can be done by means of a hydraulic pump.

The valve controlling the pressure of the hydraulic cylinder 2 is preferably configured so that it is open when energized and closed when de-energized, so that the lid will not unexpectedly close in case the lid assembly loses power. A pressure compensated needle valve ensures, regardless of the weight applied, that the lowering speed never exceed 1 l/min so that the closing speed of the lid assembly remains constant, even if additional loads are added on top of the lid, which in turn reduce the risk of a user getting a limb stuck. The hydraulic pump may further be connected to a relief valve, so that the overpressure during opening is avoided.

Furthermore, the lid assembly is not limited to a single opening element 2. An opening element 2 may be connected to each of the two scissor hinges 20 in the manner described above if an increased opening force is desired.

In the shown embodiment the lid assembly further comprises a closing element 3 provided by a gas spring 3 which bias the lid 10 towards the closed position. The gas spring 3 is connected to the two hinge members 21, 22 of one of the scissor hinges 20 such that it is compressed by the opening element 2 when the lid 10. Through this passive closing of the lid 10 and by controlling the closing speed with the valves of the hydraulic cylinder 2, injuries resulting from limbs getting stuck in the lid assembly are avoided as the force of the closing lid 10 is limited to the weight of the lid 10 and the closing element 2.

It should be noted that the opening element 2 could be connected to any one of the first ends 25, 26 of the hinge members 21, 22.

FIG. 3 shows a perspective view of a single mounting profile 30 of the lid assembly according to the invention. The mounting profile 30 is adapted for being installed either on or adjacent to the side walls of the truck bed. The mounting profile 30 comprises a c-shaped groove 31 in which a wheel 39 connected to the first end 25 of a first hinge member 21 can be retained as described above.

Installation brackets 32 are arranged in the c-shaped groove 31 such as to be displaceable along the c-shaped groove 31 and fixed in a certain position in the c-shaped groove 31. This allows the position of the installation bracket in relation to mounting profile 30 to be customized during installation of the mounting profile 30, thereby providing customizable positioning of the mounting profile 30 which ensures that the lid assembly can fit onto any truck bed 40.

The mounting profile 30 also comprises a number of installation holes 33 along the length of the mounting profile 30, adapted for installing the mounting profile 30 directly onto the side wall 41, 42. It also comprises a number of secondary installation holes 35 at each of the ends of the mounting profile 30, adapted for installing the mounting profile to an end wall 43 of the truck bed and/or at the tail gate 44. Various types of brackets and/or installation components (not shown) may be used with the installation holes 33 and/or the secondary installation holes 35, depending on the individual truck bed, to which the lid assembly is to be mounted on.

The pivotable connection to the second end 24 of the second hinge member 22 may be provided by a connection component 34 which is slidable during mounting of the lid assembly and can be fixed at a certain position in the c-shaped groove 31, such as to enable displacing of the scissor hinges 20 in relation to the mounting profile 30 and thus the lid in the second direction B. This allows for a flexible mounting of the lid assembly according to the type of truck. It should be noted, that the connection component 34 is only slidable during installation and not when mounting of the lid assembly is completed.

The c-shaped groove 31 preferably extends in the total length of the mounting profile 30, so as to allow the above mentioned installation brackets 32 and connection components 34 to have as many customization options as possible.

The mounting profile 30 is shown together with a cover profile 37. The cover profile 37 is adapted for extending between the mounting profile 30 and the upper edge of the side wall at which the mounting profile is installed; thereby covering any gap there might be between them. This is particularly relevant when the mounting profile 10 is installed on a truck bed 40 with non-parallel side walls, as the mounting profile in this case cannot be installed up against the side wall.

A lid assembly according to the prior art is shown in FIG. 4. Whereas the opening element 2 of the lid assembly according to the invention are capable of opening the lid 10 even when an additional load is added to the weight of the lid 10, the lid of the prior art relies on the user applying a force along with the support of a gas spring to open the lid.

Although the gas spring used to support opening of the lid assembly of the prior art can hold the lid open by itself, it cannot lock the lid in a given position if an extra load is added on top of the lid. For this a separate locking element is required which requires the user to remove any load put on the lid, when moving the lid between locked positions.

The lid of the prior art is mounted to the truck bed by connecting one of the scissor hinge members to a c-profile and the other scissor hinge member to the side wall. As the c-profiles are installed directly onto the side wall the scissor hinges extend vertically upwards and are therefore non-parallel with each other if the side walls are non-parallel. The lid of the prior art type further requires a specially adapted c-profile for each truck type.

The mounting profiles 30 of the invention could be used to mount the lid assembly of the prior art, i.e. a lid assembly without an opening element. By using a method comprising the steps of, installing a mounting profile at each side wall of the truck bed, such that the mounting profiles are parallel with each other, mounting the lid to the mounting profiles with two scissor hinges having a first hinge member with a first and a second end and a second hinge member with a first and a second, such the first hinge members are slidably and pivotably connected to a respective mounting profile at their first end and pivotably connected to the lid at their second ends, while the second hinge members are slidably and pivotably connected to the lid at their first end and pivotably connected to the respective mounting profile at their second ends.

FIG. 5 shows a top view of a truck bed 40 with parallel side walls 41, 42, an end wall 43, and a tail gate 44, where a mounting profile 30 has been installed at both side walls 41, 42. In the shown example, the mounting profiles 30 have been installed using angled brackets to attach them to the end wall 43 of the truck bed 40 and on the backside of the tail light housing of the truck. However, on the shown truck bed 40, wherein the side walls 41, 42 are parallel to each other, the mounting profiles 30 could have been attached directly on the side walls 41, 42, or they could have been omitted and the lid assembly could be mounted without the mounting profiles 30. Alternatively, to attaching the mounting profiles 30 directly to the end wall 43, a secondary mounting element could be used as described above, such that the mounting profiles 30 could be installed without drilling permanent mounting holes in the end wall 43 of the truck bed 40.

In FIG. 6 shows the mounting profiles 30 installed on a truck bed 40 with non-parallel side walls 41, 42, an end wall 43, and a tail gate 44. Similar to above, the mounting profiles 30 have been installed using angled brackets to attach it to the end wall 43 and the back side of the tail light housing of the truck. This leaves a gap between the side wall 41, 42 of the truck bed 40 and the mounting profile 30 which is aesthetically unappealing and may leave sharp edges of the mounting profile 30 exposed. As shown in FIG. 7 this can be covered using cover profiles 32 which overlap the upper edge of the side wall 41, 42. The dashed lines in FIG. 7 indicate the position of the side walls 41, 42 which along with the end wall 43 and tail gate 44 define an isosceles trapezoid shaped truck bed 40.

FIGS. 8 and 9 show the truck beds 40 of FIGS. 5 and 6, respectively, with the lid assembly mounted. Whereas a lid assembly of the prior art would require a customized lid for the truck bed 40 with the non-parallel side walls 41, 42, the mounting profiles 30 allow the lid assembly of the invention to be mounted regardless of the angle of the side walls 41, 42.

FIG. 8 further shows how the cover profile 37 serve to cover the areas of the truck bed 40 which the lid 10 does not cover by spanning between the side wall 41, 42 and the mounting profile 30, effectively making the exposed part of the truck bed 40 rectangular shaped.

It should be noted, that the lid assembly of the invention could be mounted directly onto non-parallel side walls without using the mounting profiles 30. This however, would require that the lid would have the same shape as the truck bed, or that the grooves 11 providing the slidable and pivotal connections for the second hinge members 22 of the scissor hinges 20 would have to be aligned with the side walls.

It is also feasible to provide a lid assembly of the type described above without the opening element 2 but with mounting profiles 30 and optionally also mounting elements 36 and/or cover profiles 37.

A lid assembly for a truck bed with two opposite vertical side walls 41, 42, comprising, a lid 10 adapted for covering the truck bed 40, said lid 10 being movable in a first direction between an open and closed position, two scissor hinges 20 adapted for mounting the lid 10 to the truck bed 40, each of said scissor 20 hinges having a first hinge member 21 adapted for being slidably and pivotally connected to a respective side wall 41,42 of the truck bed 40 at a first end 25 and being pivotably connected to the lid 10 at a second end 27, and a second hinge member 22 which is slidably and pivotally connected to the lid 10 at a first end 26 and adapted for being pivotably connected to the respective side wall 41, 42 at a second end 24, and two mounting profiles 30 adapted for being installed adjacent to respective side walls 41, 42 of the truck bed 40 and parallel to each other and comprising connecting elements for connection with the first ends 25 of the first hinge members 21 and the second ends 24 for the second hinge members 22.

Such a lid assembly could further comprise two cover profiles 37 adapted for being arranged such that each of the two cover profiles 37 overlap a respective mounting profile 30 and the adjacent vertical side wall 41, 42 of the truck bed 40, and/or a mounting element 36 adapted for being installed at an end wall 43 of the truck bed 40 and/or comprising elements for installing the mounting profiles 30 to the truck bed 40.

In another embodiment of such a lid assembly at least one of the mounting profiles 30 are adapted for extending along the whole length of the side wall 41, 42 of the truck bed 40.

And in yet another embodiment of such a lid assembly the mounting element 36 are adapted for extending along the whole length of the end wall 43 of the truck bed 40.

Turning now to FIG. 11, a side view of a lid assembly according to the invention. The lid assembly shown further comprises a safety mechanism adapted for interrupting closing of the lid in the event that something, e.g. a body part of a user, is stuck in the lid assembly. In the shown embodiment the lid is mounted to the truck bed 40 by two mounting profiles 30 as in FIG. 1. However, in the shown embodiment, the groove 31, in which the wheel 39 connecting the first end 25 of the first hinge member 21 is retained, has a width, i.e. the distance between the lower and upper flange, which is slightly larger than the diameter of the wheel 39. This results in a small spacing between the wheel 39 and the upper wall of the groove 30. Wherein one or more pressure activated switched 51 can be arranged. The pressure activated switched 51 is adapted for actuating the safety mechanism, such that the opening element 2 will open the lid 10 in the event that a switch 51 is activated.

During normal operation, the wheel 39 is able to pass the switch without contact, due to the spacing between the wheel 39 and the upper wall of the groove 30. However, in the event that something, e.g. a body part, is stuck between one of the hinge members 21, 22 and the side walls 41, 42 of the truck or other parts of the lid assembly, the wheel 39 will rise a bit, thereby contacting the upper wall of the groove 30 and activating the switch 51, whereby the opening element 2 is actuated and the lid 10 opened.

In the shown embodiment, the switch 51 is placed near the tail gate 44 of the truck, at the installation bracket 32. The switch 51 is placed approximately an arms width from the installation bracket 32 where the first end 25 of the first hinge member 21 is situated in the closed position of the lid 10, such that the wheel 39 will contact rise within the groove 30 and contact the switch 51, if an arm should be caught between the installation bracket 32 and the hinge members 21, 22 or between the lid 10 and the side wall 41, 42.

In some embodiments, the entire upper wall of the groove 30 may be provided with covered by one or more switches, such that no matter the position of the wheel 39 along the length of the groove 30, it will activate the safety mechanism if it is pushed upwards. Similarly, one or more switched may be arranged in the lid 10 near the wheel 39 connecting the first end 26 of the second hinge member 22, such that this wheel 39 may also trigger the safety mechanism.

FIGS. 12, 13, and 14 show an end view of the groove 30 during unobstructed closing of the lid, an end view of the groove 30 when closing is obstructed, and a side view sketching both events, respectively. As it can be seen in the figures, the groove 30 is slightly wider than the diameter of the wheel 39, thus providing a clearance for the wheel 39 to pass the pressure switch 51 during unobstructed closing of the lid assembly. As mentioned above, the entire length of the groove 30 may be provided with one or more switches 51, however, the most important position of arranging a pressure switch 51 is near the end of the groove 30 where the wheel 39 connecting the first end 25 of the first hinge member 21 is situated when the lid assembly is closed, as the wheel 39 will be in this position along the length of the groove 30, when the lid 10 is approximately an arms width from the side walls 41, 42, or the first hinge member is near the installation bracket 32, and therefore the position the wheel 39 will engage the upper wall of the groove 30 if e.g. an arm of a user should be stuck between either of these elements.

FIGS. 12 and 13 show an end view of the groove 31 during unobstructed and obstructed closing of the lid 10, respectively. During normal, unobstructed closing, FIG. 12, the wheel 39 is capable of passing the switch 51 without engaging it, due to the clearance provided by the slightly wider groove 31. During unobstructed closing, the wheel 39 is effected by gravity, forcing it downwards in the groove in a direction C. In the event that closing of the lid is obstructed, FIG. 13, the first hinge member 21 will experience a force caused by the object causing the obstruction and the closing element 3, if present, which will result in movement of the wheel 39 in an upwards direction D, causing the wheel 39 to engage the switch 51, which in turn will trigger the safety mechanism and actuate the opening element 2.

In FIG. 14, the wheel 39 connecting the first end 25 of the first hinge member 21 to the mounting profile 30 is shown in three different positions along the length of the groove 31, corresponding to a position of the lid assembly wherein the lid is half-way closed, approx. 15 cm from closed, and closed. As mentioned above, the switch 51 is positioned such that it covers the position along the length of the groove 31 which the wheel 39 will be in if an arm is stuck in the lid assembly during closing of the lid assembly.

The final part of the groove 31, i.e. the length of the groove 31 in which the wheel 39 is retained after passing the switch 51 when closing the lid assembly, is not covered by the pressure activated switch 51. This is partly because the lid 10 has passed the critical positions where limps may get caught and the lid assembly is nearly or fully closed. Additionally, this part of the groove 31 is not covered by a switch 51 to avoid unintentional triggering of the safety mechanism. If the last part of the groove 31 was covered by a switch 51, the safety mechanism could be triggered from the outside, possibly by a burglar by pulling up in the lid 10, thereby forcing the wheel to engage the switch 51 and actuating the opening element 2.

The invention claimed is:

1. A lid assembly for a truck bed with two opposite vertical side walls, comprising:
    a lid adapted for covering the truck bed, said lid being movable in a first direction between an open position and a closed position;
    two scissor hinges arranged at opposite sides of the lid, and adapted for mounting the lid to the truck bed, each of said two scissor hinges having
        a first hinge member adapted for being slidably and pivotably connected to a respective side wall of the truck bed at a first end and being pivotably connected to the lid at a second end, and
        a second hinge member which is slidably and pivotably connected to the lid at a first end and adapted for being pivotably connected to the respective side wall at a second end; and
    an opening element adapted for, upon actuation, applying a force to at least one of the first ends of the hinge members such as to move the lid in the first direction, said force being directed in a second direction, which extends in an angle of between 85 and 95 degrees with respect to the first direction,
    wherein the opening element is arranged extending between the first hinge member and the second hinge member of one of the two scissor hinges and being attached to the first hinge member at the first end of the first hinge member and to the second hinge member at the second end of the second hinge member, respectively.

2. The lid assembly of claim 1, wherein the second direction is substantially perpendicular to the first direction.

3. The lid assembly of claim 1, wherein the lid during movement in the first direction remains parallel with the second direction.

4. The lid assembly of claim 1, wherein the opening element is a pneumatic cylinder or a hydraulic cylinder.

5. The lid assembly of claim 1, and further comprising a closing element adapted for biasing said lid towards the closed position.

6. The lid assembly of claim 5, wherein the closing element is a gas spring.

7. The lid assembly of claim 1, and further comprising any one or more of:
    two mounting profiles adapted for being installed adjacent to respective side walls of the truck bed and parallel to each other and comprising connecting elements for connection with the first ends of the first hinge members and the second ends of the second hinge members,
    two cover profiles adapted for being arranged such that each of the two cover profiles overlap a respective mounting profile and the adjacent vertical side wall of the truck bed, and
    a mounting element adapted for being installed at an end wall of the truck bed and/or comprising elements for installing the mounting profiles to the truck bed.

8. The lid assembly of claim 7, wherein at least one of the mounting profiles are adapted for extending along the whole length of the side wall of the truck bed.

9. The lid assembly of claim 7, wherein the mounting element is adapted for extending along the whole length of the end wall of the truck bed.

10. The lid assembly of any one of claim 7, wherein the mounting profiles comprise a groove extending along the length of the mounting profiles.

11. The lid assembly of claim 10, further comprising one or more installation brackets adapted for installing the mounting profiles on the truck bed, wherein the one or more installation brackets are slidable within the groove of the respective mounting profile during installation and fixed after installation.

12. The lid assembly of claim 1, wherein the lid assembly further comprises a safety mechanism adapted to, upon actuation, activate the opening element during closing of the lid assembly, such that the closing of the lid is interrupted and the opening element opens the lid assembly.

13. The lid assembly of claim 10, wherein the lid assembly further comprises a safety mechanism adapted to, upon actuation, activate the opening element during closing of the lid assembly, such that the closing of the lid is interrupted and the opening element opens the lid assembly,
    wherein the groove of each respective mounting profile provide the slidable connection between the first end of the respective first hinge member and the mounting profile by retaining a wheel or a slide shoe pivotably connected to the first end of the first hinge member, and the safety mechanism comprise a pressure switch arranged on an upper wall of at least one of the grooves.

* * * * *